P. A. WEIGEL.
VARIABLE SPEED GEARING.
APPLICATION FILED JUNE 8, 1914. RENEWED JAN. 18, 1917.

1,227,985.

Patented May 29, 1917.
3 SHEETS—SHEET 1.

Witnesses
T. L. Mockabee
Robt. Patterson

Inventor
Philip A. Weigel,
By M. Van Boskirk
Attorney

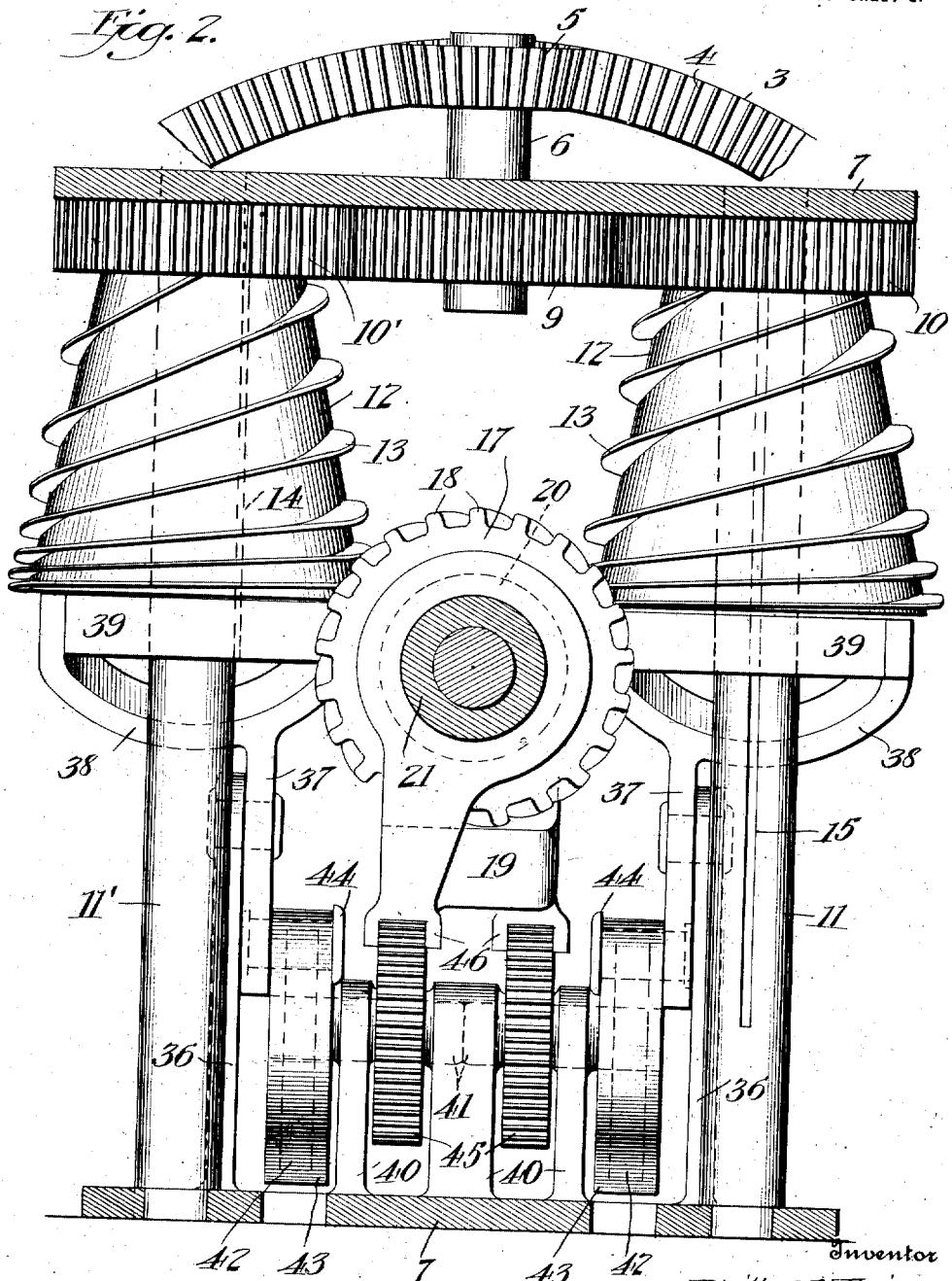

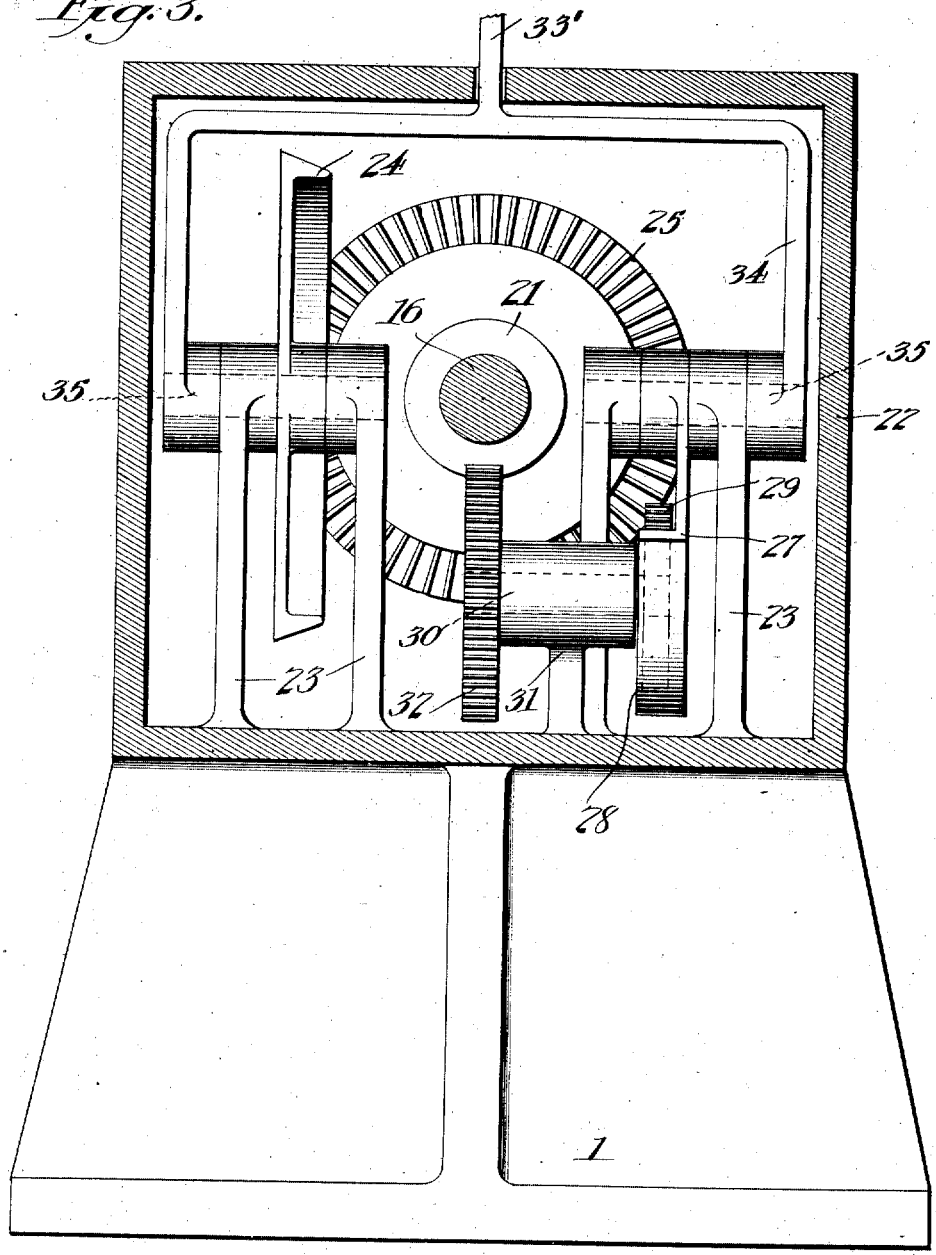

UNITED STATES PATENT OFFICE.

PHILIP A. WEIGEL, OF RIVERTON, NEW JERSEY, ASSIGNOR, BY MESNE ASSIGNMENTS, TO AUTO TRANSMISSION COMPANY, A CORPORATION OF DELAWARE.

VARIABLE-SPEED GEARING.

1,227,985. Specification of Letters Patent. Patented May 29, 1917.

Application filed June 8, 1914, Serial No. 843,597. Renewed January 18, 1917. Serial No. 143,198.

*To all whom it may concern:*

Be it known that I, PHILIP A. WEIGEL, a citizen of the United States of America, residing at Riverton, in the county of Burlington and State of New Jersey, have invented certain new and useful Improvements in Variable-Speed Gearing, of which the following is a specification.

This invention relates to gearing and, more especially, to that form of gearing used to secure a variety of speeds.

The objects of the invention are:—

To provide a novel form of cone gears having curved, tapered teeth thereon;

To provide a novel construction of speed changing mechanism, wherein novel means are provided for causing the driven shaft to rotate at variable speeds, relative to the driving shaft;

To provide a novel form of cone driving gear with a helical tooth, or worm thereon;

To provide novel means for adjusting the driving and driven gears, with respect to each other.

With these and such other objects in view, as may hereinafter more fully appear, my invention consists in the novel arrangement and construction of parts set forth in the following specification, more particularly pointed out in the claims, and which are shown in the accompanying drawings, wherein:—

Fig. 2 is a vertical sectional view taken on the line 2—2 of Fig. 1.

Fig. 3 is an end elevation of the shifting mechanism, the casing being shown in section.

Figure 1:
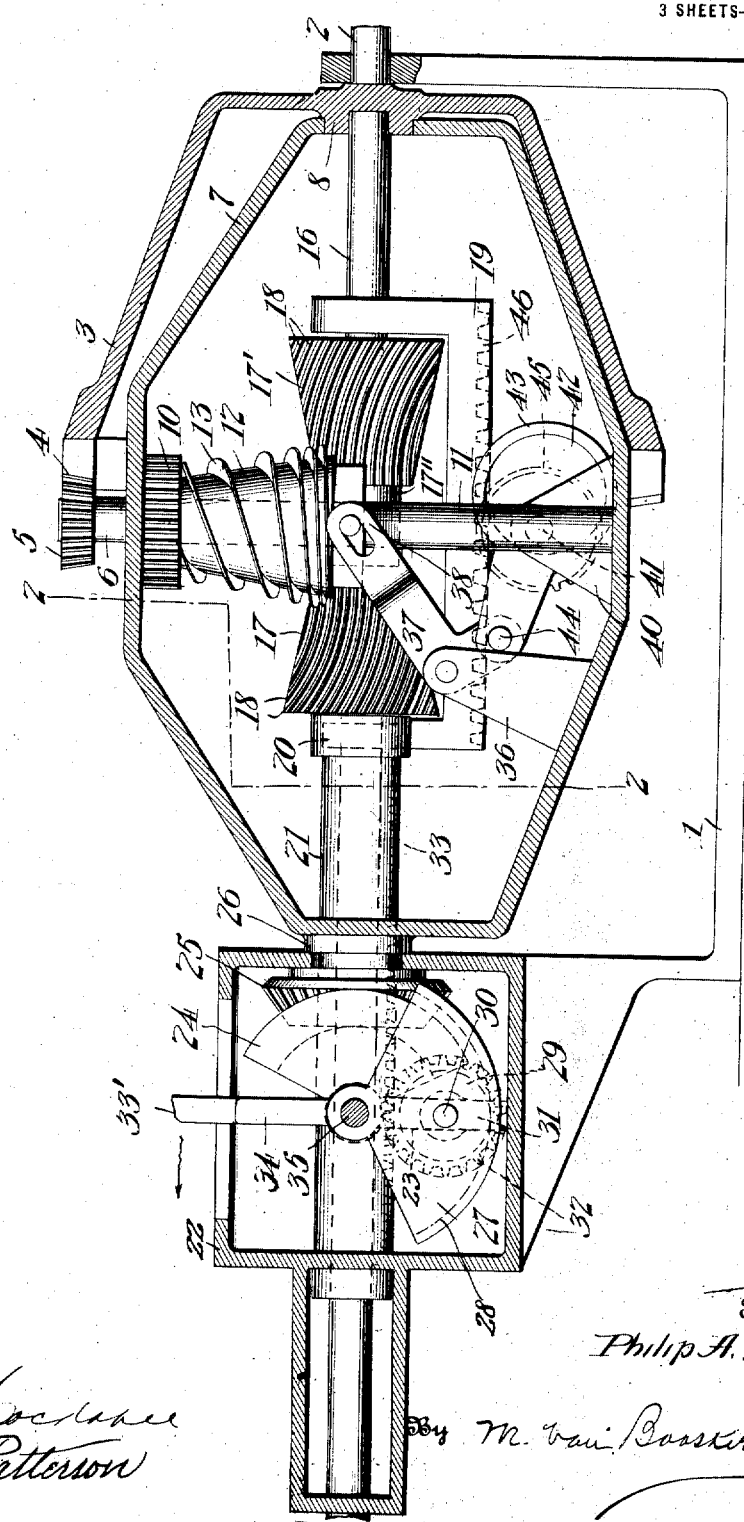
Figure 1 is a side elevation of the device, partly in section.

While the construction described and illustrated in the accompanying drawings is one at present preferred by me and typifying my invention, it will be understod that various changes in the form, proportions, size and minor details of the invention as an entirety, may be made without departing from its spirit or sacrificing any of its advantages.

Referring to said drawings by numerals:—

A suitable support, or base 1, has journaled therein a driving shaft 2, which may be connected in any well known manner to a suitable source of power, or energy.

Mounted on said shaft 2, within the support 1, is a bell-shaped member 3 provided, around its mouth, with an annular gear 4.

Gear 4 meshes with a pinion 5 carried on the outer end of a stub-shaft 6 journaled in frame 7.

Frame 7 is positioned within the support 1 and has one end located within the aforesaid bell-shaped member 3. A hub 8 is formed on the interior of the top of the bell-shaped member 3, and is adapted to enter a suitable opening formed in one end of frame 7 for the purpose of forming a journal; the other end of said frame being journaled in the support 1.

On the inner end of stub-shaft 6, is mounted a pinion 9, meshing with pinions 10 and 10', which said pinions are carried by shafts 11 and 11', respectively, extending transversely of the frame 7, in which they are journaled.

Mounted on the shafts 11 and 11' are similar cones 12 provided with a spiral flange, or gear tooth 13. The cones 12 are slidable upon their respective shafts but are constrained to rotate therewith by the keys 14 located in slots, or keyways 15, formed in said shafts.

Extending longitudinally of said frame 7, and having one end journaled in a suitable bore formed in the said hub 8 and its other end journaled in the support 1, is the driven shaft 16.

Mounted on the shaft 16, and slidably keyed thereto in the usual and well known manner, are the similar cone gears 17 and 17' provided with the longitudinally positioned, curved teeth 18 adapted to mesh with the said spiral teeth 13 of cones 12. Cones 17 and 17' are joined at their smaller ends by the hub, or sleeve 17".

Loosely mounted on the shaft 16, and embracing the gears 17 and 17', is a yoke 19, one end of which has secured thereto, by the collar head 20, a sleeve 21 which is slidable upon the shaft 16.

Within a suitable boxing, or casing 22, formed on the support 1, are journaled in supports 23 a segment gear 24 adapted to mesh with bevel gear 25, which is integral with the frame 7 being connected thereto by the hollow cylindrical member 26, and a segment gear 27 mounted on shaft 35 and meshing with pinion 29 being formed with a laterally extending, peripheral flange 28 the inner face of which carries gear teeth adapted to mesh with a pinion 29, mounted on a shaft 30 journaled in a support 31; to the other end of which shaft is secured a pinion 32 adapted to mesh with a rack 33 formed in the said sleeve 21. The actuation of these parts is accomplished through the lever 33', terminating in the yoke 34, the ends of which yoke are rigidly connected to the shafts 35 which carry the said segment gears 24 and 27.

Pivotally secured to suitable supports 36, formed in the aforesaid frame 7, are bell-crank levers 37 one arm of which ends in the pronged, or divided portion 38, the ends of which said portion are slidably connected to the collars 39 which are loosely mounted on the ends of the cone gears 12.

Journaled in suitable supports 40, mounted in frame 7, is a shaft 41. Mounted on either end of said shaft 41 is a cam 42, surrounded by a cam strap 43 provided with a projecting arm the end of which is pivotally connected to the bell-crank lever 37, as shown most clearly at 44.

Also mounted on the shaft 41, and constrained to revolve therewith, are the pinions 45 adapted to mesh with racks formed in said yoke 19, said racks being preferably shrouded as shown most clearly at 46.

The operation of the device is as follows:—

The shaft 2, being connected to a suitable source of power, is revolved and with it the bell-shaped member 3, thereby causing revolution of the pinion 5, shaft 6 and pinion 9.

Motion is imparted from the pinion 9 to the pinions 10 and 10', with which it meshes, causing the shafts 11 and 11' to revolve, and with them the cones 12.

From cones 12 motion is imparted to shaft 16 through cone 17, or 17' with which cones 12 alternately mesh.

The direction of revolution of shaft 16, and also the speed of such revolution, is controlled by means of the lever 33 which, when thrown in the direction of the arrow, causes the cones 12 to mesh with cone 17'; and, when thrown in the opposite direction, causes them to mesh with cone 17.

When the lever 33 is thrown several operations take place, as follows:—The segment gear 24, being revolved, causes a revolution of the bevel gear 25 and with it the frame 7. It will be noted that the revolution thus imparted to frame 7 is always in the direction of motion of shaft 16, thereby lessening the strain, or shock of throwing the gears out of mesh. Segment 27 is also revolved, which causes a revolution of pinion 29, with which it meshes, thereby revolving pinion 32 which, through its engagement with rack 33, slides sleeve 21 along shaft 16 and, with said sleeve, the yoke 19 and gears 17 and 17'.

The movement of yoke 19 causes a revolution of the pinions 45 and, through them, of the cams 42, causing a throw of their straps and arms which actuates the bell-crank levers 37 to change the position of the cones 12.

We thus see that the cones 17 and 17' may be slid into and out of engagement with the cones 12, to change the direction of motion, while their positions and that of cones 12 may be varied with respect to each other, to secure a wide range of changes of speed.

Although I have referred to a spiral flange 13 on each of the driving cones 12, in the sense of a single flange on each cone, it will be observed that in both Figs. 1 and 2 of the drawings I have illustrated a pair of counterpart spiral flanges the pitch of which gradually decreases from the small to the large end of the cone, and I therefore desire that it be understood that I do not confine myself to one or even to two spiral flanges on the driving cones but contemplate the use of a plurality of two or more flanges, always, however, confining myself to a construction in which said flanges are of precisely counterpart form, and each of continuously spirality extending from one end of the cone to the other end.

It will be further observed that in the spiral reach, or trend of a given spiral flange 13, the convergence of its course, so to speak, is such that according to the position of its driving cone 12 relatively to the position of a driven cone 17,—the curved teeth 18 of which extend only from one end of the cone to the other, and not spirally,—a sufficiently greater or less number of curved teeth may be included between the walls of a given spiral flange, or flanges, to increase or diminish the then relative speeds of the engaged cones.

It will be understood that, while the foregoing description together with the drawings set forth a practical embodiment of my invention, slight changes in structural arrangement and combination of parts may be resorted to without departing from the spirit of my invention or the scope of the claims.

Having described my invention, what I claim as new and desire to secure by Letters Patent, is:—

1. In a variable speed gearing, a cone driving gear, a helical flange thereon, a cone driven gear, curved teeth thereon adapted to mesh with said helical flange, and mechanism for shifting said gears to secure a variation of speed.

2. In a variable speed gearing, a support, a driving shaft journaled therein, a bell-shaped member on said driving shaft, variable speed driving gears actuated by said bell-shaped member, driven gears adapted to mesh with said driving gears, and mechanism for simultaneously shifting said gears.

3. In a variable speed gearing, a support, a frame rotatably mounted in said support, a driving shaft journaled in said support, variable speed driving gears journaled in said frame, driven gears adapted to mesh with said driving gears, gearing between said driving shaft and said driving gears, and mechanism for simultaneously shifting said driving and driven gears and rotating said frame.

4. In a variable speed gearing, a suitable support, a frame rotatably mounted in said support, driving gears journaled in said frame, driven gears adapted to mesh with said driving gears, means for shifting said driven gears, and mechanism operated by said shifting means for changing the position of said driving gears.

5. In a variable speed gearing, a support, a bell-shaped driving gear journaled in said support, a frame journaled in said support and said bell-shaped member, variable speed gearing journaled in said frame, gearing between said bell-shaped gear and said variable speed gearing, and mechanism for shifting said valiable speed gearing.

6. In a variable speed gearing, a driving shaft, a gear mounted thereon, a driven shaft, gears on said shaft adapted to mesh with said driving gear, a yoke loosely mounted on said driven shaft and embracing said gears, a sleeve secured to said yoke and slidable on said driven shaft, a rack formed on said sleeve, a pinion meshing with said rack, and means for actuating said pinion to reciprocate said sleeve and yoke.

7. In a variable speed gearing, a cone driving gear, a helical flange thereon extending from one end to the other thereof, a cone driven gear, curved teeth thereon extending from one end to the other thereof and adapted to mesh with said helical flange, and mechanism for shifting said gears to secure a variation of speed.

8. In a variable speed gearing, a cone driving gear, a plurality of helical flanges thereon extending from one end to the other thereof, a cone driven gear, curved teeth thereon extending from one end to the other thereof, and adapted to mesh with said helical flanges, and mechanism for shifting said gears to secure a variation of speed.

9. In a variable speed gearing, a plurality of cone driving gears, a helical flange on each of said gears extending from one end to the other thereof, a plurality of cone driven gears, counterpart curved teeth thereon extending from one end to the other thereof, and adapted to mesh respectively with said respective helical flanges, and mechanism for shifting said gears to secure a variation in speed.

10. In a variable speed gearing, a plurality of cone driving gears, a plurality of counterpart helical flanges respectively thereon and each extending from one end to the other of said gears, a plurality of cone driven gears, curved counterpart teeth thereon adapted to mesh respectively with said helical flanges, and mechanism for shifting said gears to secure a variation in speed.

In testimony whereof I hereunto affix my signature in presence of two witnesses.

PHILIP A. WEIGEL.

Witnesses:
J. M. CODDINGTON,
F. TRAUTMAN.